United States Patent [19]

Kirk et al.

[11] Patent Number: 5,010,781
[45] Date of Patent: Apr. 30, 1991

[54] RETAINING ASSEMBLY FOR THROTTLE AND SPEED CONTROL CABLES

[75] Inventors: Michael P. Kirk, Utica; Blake W. Good, Livonia, both of Mich.

[73] Assignee: Chrysler Corporation, Highland Park, Mich.

[21] Appl. No.: 529,847

[22] Filed: May 29, 1990

[51] Int. Cl.$^5$ .................. F16C 1/10; F16G 11/00
[52] U.S. Cl. .................. 74/502.4; 74/502.6; 74/502.5; 248/56; 403/197; 403/316; 174/153 G
[58] Field of Search ............ 74/501.5 R, 502.4–502.6; 248/56; 403/197, 238, 316; 174/153 G

[56] References Cited

U.S. PATENT DOCUMENTS

| | | | |
|---|---|---|---|
| 3,752,008 | 8/1973 | Danek | 74/502.4 |
| 3,955,441 | 5/1976 | Johnson | 403/316 X |
| 4,304,148 | 12/1981 | Hamman | 248/56 X |
| 4,534,239 | 8/1985 | Heimann | 74/502.4 |
| 4,763,541 | 8/1988 | Spease | 74/502.4 X |
| 4,785,686 | 11/1988 | Thomas | 74/502.4 |
| 4,790,206 | 12/1988 | Thomas | 74/502.4 |

Primary Examiner—Leslie A. Braun
Assistant Examiner—Winnie Yip
Attorney, Agent, or Firm—Kenneth H. MacLean, Jr.

[57] ABSTRACT

A retaining assembly for retaining a throttle and speed control cable to a cable mounting bracket. The retaining assembly includes a first end fitting on the speed control cable with spaced flanges which allow the first end fitting to slide into an aperture in the cable mounting bracket and prevent longitudinal movement of the first end fitting relative to the cable mounting bracket. The retaining assembly also includes a second end fitting on the throttle control cable with retaining clips which allow the second end fitting to snap into the aperture in the cable mounting bracket to prevent longitudinal movement of the second end fitting relative to the cable mounting bracket. The second end fitting also abuts the first end fitting to prevent the first end fitting from disengaging the cable mounting bracket.

17 Claims, 3 Drawing Sheets

RETAINING ASSEMBLY FOR THROTTLE AND SPEED CONTROL CABLES

BACKGROUND OF THE INVENTION

1. Field of the Invention

The present invention relates generally to throttle and speed control cables for automotive vehicles, and more particularly, to a retaining assembly for throttle and speed control cables.

2. Description of Related Art

Generally, a throttle control cable has one end operatively connected to a throttle of an engine on an automotive vehicle. This end of the throttle control cable snaps into a cable mounting bracket for load bearing when the throttle is actuated. The other end of the throttle cable is attached to the accelerator pedal and dash panel of the vehicle. Similarly, a speed control cable has one end operatively connected to an electronic control unit or servo on the vehicle. The other end of the speed control cable snaps into the cable mounting bracket for operative connection the throttle.

One disadvantage of the above is that the throttle and speed control cables do not have a positive locking feature for retaining them to the cable mounting bracket without use of a fastener or other device. As a result, either the throttle and/or speed control cable may become disconnected from the cable mounting bracket if dimensional tolerances between the cables and cable mounting bracket are not held. This result is undesirable.

SUMMARY OF THE INVENTION

It is, therefore, one object of the present invention to provide a retaining assembly for throttle and speed control cables.

It is another object of the present invention to positively lock the throttle and speed control cables to the cable mounting bracket.

It is a further object of the present invention to eliminate the snap-in feature of the speed control cable.

To achieve the foregoing objects, the present invention is a retaining assembly for retaining a throttle and speed control cable to a cable mounting bracket. The retaining assembly includes a first end fitting on the speed control cable having means for allowing the first end fitting to slide into an aperture in the cable mounting bracket and for preventing longitudinal movement of the first end fitting relative to the cable mounting bracket. The retaining assembly also includes a second end fitting on the throttle control cable having means for allowing the second end fitting to snap into the aperture in the cable mounting bracket for preventing longitudinal movement of the second end fitting relative to the cable mounting bracket. The second end fitting also includes means abutting the first end fitting for preventing the first end fitting from disengaging the cable mounting bracket.

One advantage of the present invention is that the retaining assembly provides a positive locking feature for preventing the throttle and speed control cables from being disconnected with the cable mounting bracket if dimensional tolerances are not held. Another advantage of the present invention is that the speed control cable slides into place instead of snapping forward into the cable mounting bracket. Only the throttle cable snaps into the cable mounting bracket. As a result, the speed control cable does not disengage or pop out of the cable mounting bracket.

Other objects, features and advantages of the present invention will be readily appreciated as the same becomes better understood after reading the following description and accompanying drawings.

DESCRIPTION OF THE PREFERRED EMBODIMENT(S)

Figure 1:
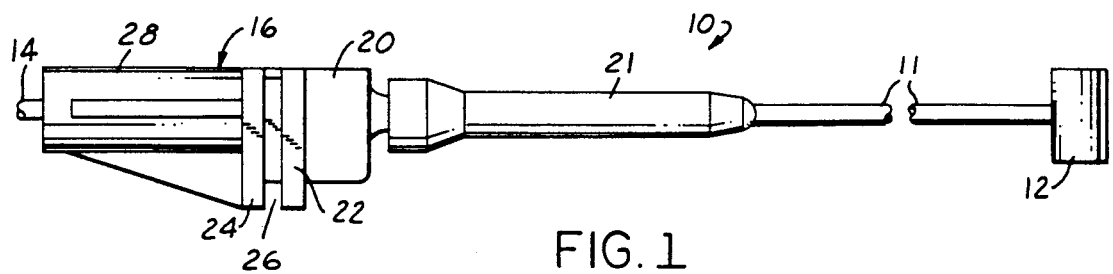
FIG. 1 is a planar top view of a speed control cable according to the present invention.
Figure 2:
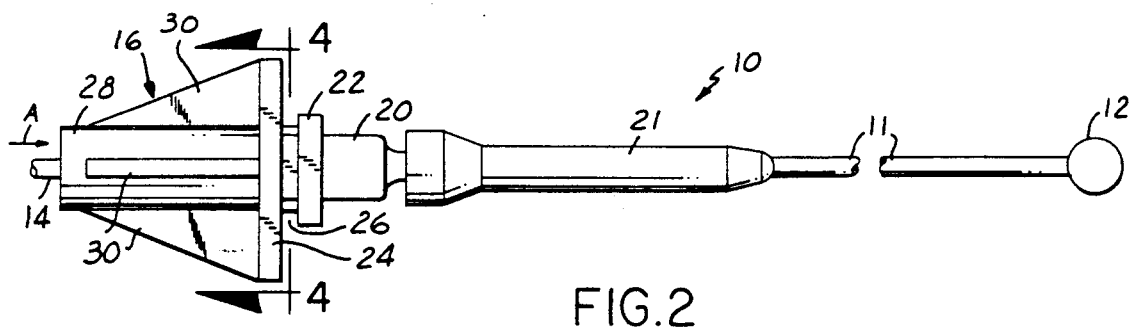
FIG. 2 is an elevational side view of the speed control cable of FIG. 1.
Figure 3:
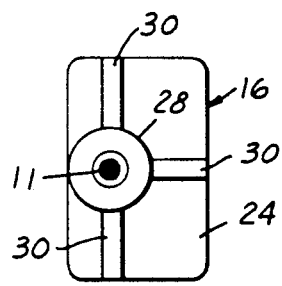
FIG. 3 is an end view of the left hand end of the speed control cable of FIG. 2.

Referring to FIGS. 1 through 4, a speed control cable 10 according to the present invention is shown. The speed control cable 10 includes a cable 11 which extends generally longitudinally between first and second ends 12 and 14, respectively. The first end 12 is adapted for operative connection to an engine throttle (not shown) of an automotive vehicle (now shown). The second end 14 is adapted for operative connection to an electronic control unit or servo (not shown) of the automotive vehicle. The speed control cable 10 also includes an end fitting, generally indicated at 16, for operative connection with a cable mounting bracket, generally indicated at 18 in FIGS. 11 through 13 to be described. The cable mounting bracket 18 is adapted for connection to an engine on the automotive vehicle.

Figure 4:
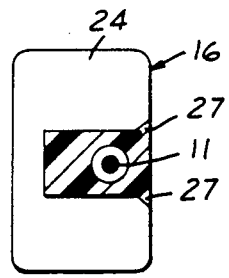
FIG. 4 a sectional end view taken along lines 4-4 of FIG. 2.
Figure 5:
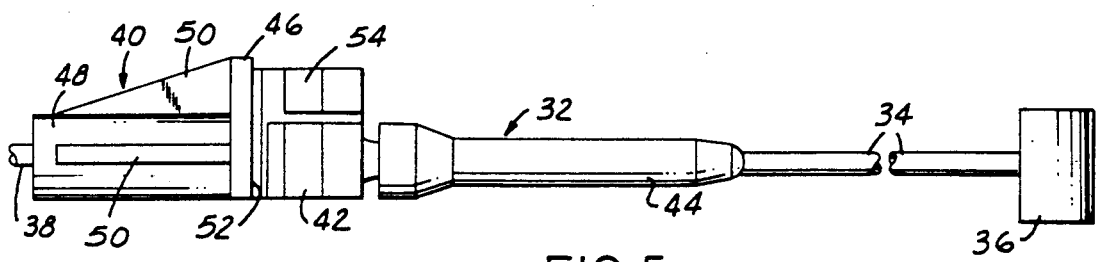
FIG. 5 a planar top view of a throttle control cable according to the present invention.

The end fitting 16 includes a generally rectangular body 20. A sheath or conduit 21 encloses a portion of the cable 11 adjacent the body 20. The body 20 has a pair of longitudinally spaced first and second flanges 22 and 24 extending outwardly and substantially perpendicular to the body 20. The first flange 22 is generally rectangular in shape and has a width and height greater than the width and height of the body 20. The second flange 24 is generally rectangular in shape and has a width greater than the width of the first flange 22. The first and second flanges 22 and 24 define a space 26 therebetween. The length or thickness of the space 26 is slightly greater than the thickness of the cable mounting bracket 18. As illustrated in FIG. 4, the portion of the body 20 in the space 26 includes outwardly extending tangs 27 which shaped as triangles in cross-section. The tangs 27 cooperate with the cable mounting bracket 18 in a manner to be described to prevent reverse installation of the end fitting 16 to the cable mounting bracket 18.

The end fitting 16 also includes a generally circular and cylindrical connection member 28 extending longitudinally outwardly from he second flange 24. The connection member 28 has a plurality of generally triangular shaped ribs 30 extending outwardly longitudinally from the second flange 24 along the connector member 28 and substantially perpendicular thereto. The ribs 30 provide sufficient rigidity between the connection member 28 and flange 24 to prevent or resist deflection of the flange 24 when mounted to the cable mounting bracket 18. Preferably, the end fitting 16 is made of a plastic material. It should be appreciated that the cable 11 extends through the body 20, flanges 22 and 24 and connection member 28.

Referring to FIGS. 5 through 10, a throttle control cable 32 is shown. The throttle control cable 32 includes a cable 34 extending generally longitudinally between first and second ends 36 and 38, respectively. The first end 36 is adapted for operative connection to a throttle (not shown) of the automotive vehicle. The second end 38 is adapted for operative connection to the accelerator pedal and dash panel of the vehicle. The throttle control cable 32 also includes an end fitting, generally indicated at 40, for operative connection with the cable mounting bracket 18.

Figure 6:
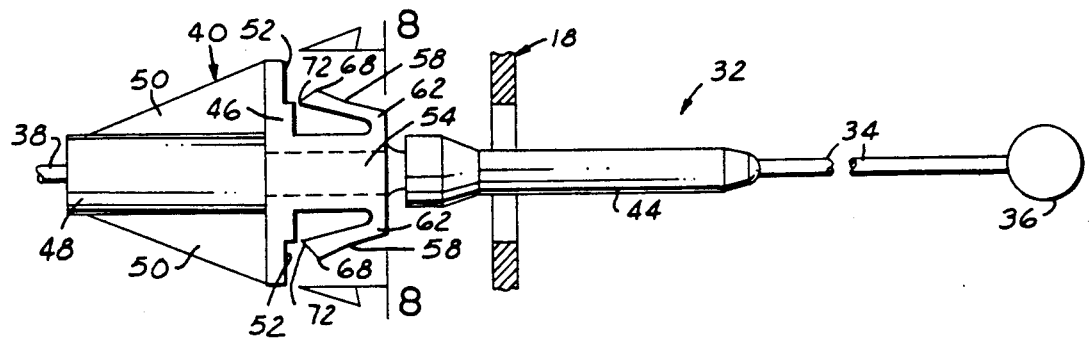
FIG. 6 an elevational side view of the throttle control cable of FIG. 5.
Figure 7:
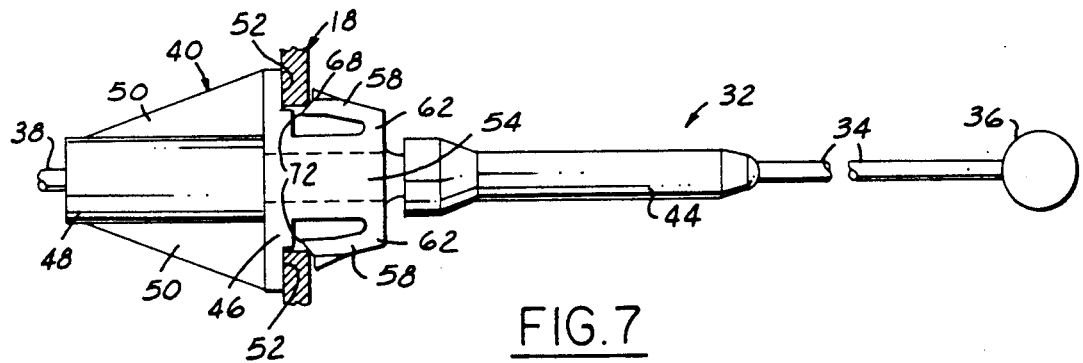
FIG. 7 is a view similar to FIG. 6 with the throttle control cable retained in a cable mounting bracket.

The end fitting 40 includes a generally rectangular body 42. A sheath or conduit 44 encloses a portion of the cable 34 adjacent the body 42. The body 42 has a generally rectangular flange 46 extending outwardly and substantially perpendicular to the body 42 at the longitudinal end thereof. The flange 46 has a width and height greater than the width and height of the body 42. The end fitting 40 also includes a generally circular and cylindrical connection member 48 extending longitudinally outwardly from the flange 46. The connection member 48 has a plurality of generally triangular shaped ribs 50 extending outwardly longitudinally from the flange 48 along the connector member 48 and substantially perpendicular thereto. The ribs 50 provide sufficient rigidity between the connection member 48 and the flange 46 to prevent or resist deflection of the flange 46 when mounted to the cable mounting bracket 18. As illustrated in FIGS. 6 and 7, the flange 46 also has a stepped recess portion 52 on the side opposite the connection member 48 for a function to be described. Preferably, the end fitting 40 is made of a plastic material. It should be appreciated that the cable 34 extends through the body 42, flange 46 and connection member 48.

Figure 8:
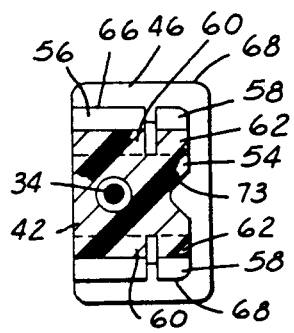
FIG. 8 a sectional end view taken along lines 8—8 of FIG. 6.
Figure 9:
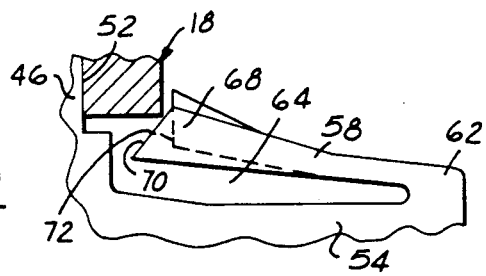
FIG. 9 is an enlarged partial fragmentary view of a portion of FIG. 7.
Figure 10:
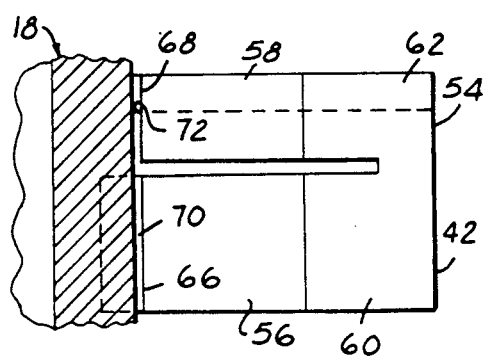
FIG. 10 is a partial fragmentary top view of the portion of FIG. 9.

The end fitting 40 also includes a retention portion 54 transversely spaced from the body 42 and extending generally longitudinally from the flange 46. The body 42 and retention portion 54 have first and second pairs of retaining clips 56 and 58, respectively. The retaining clips 56 and 58 have one end 60 and 62, respectively, hingedly connected to the body 42 and retention portion 54. The retaining clips 56 and 58 extend longitudinally outwardly at an angle to define a space 64 between the retaining clips 56 and the body 42 and retention portion 54. The retaining clips 56 and 58 have free ends 66 and 68, respectively. The free ends 66 and 68 have an inclined faces 70 and 72 which are adapted to engage the cable mounting bracket 48 as illustrated in FIGS. 9 and 10. The retaining clips 56 and 58 have flexibility and resiliency to allow the retaining clips 56 and 58 to be deflected inwardly and return to their original position. As illustrated in FIG. 8, the retention portion 54 also includes mounting bracket 18 in a manner to be described to prevent reverse installation of the end fitting 40 to the cable mounting bracket 18.

Figure 11:
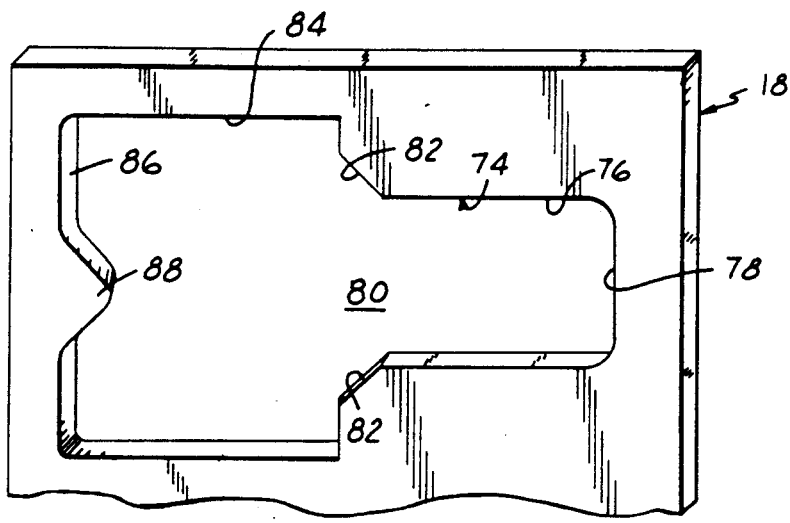
FIG. 11 is a partial perspective view of the cable mounting bracket according to the present invention.

Referring to FIG. 11, the cable mounting bracket 18 is generally planar and defines an aperture, indicated at 74. The aperture 74 has a first portion 76 which is generally rectangular in shape with a closed end 78 and an open end 80. The open end 80 has included side walls 82 which open to a second portion 84 which is generally rectangular in shape. The second portion 84 has a width and length greater than the width and length of the first portion 76. The second portion 84 has a closed end 86 with a generally triangular projection 88 extending inwardly into the second portion 84. It should be appreciated that the second portion 84 has an open end 80 which is the open end of the first portion 76.

Figure 12:
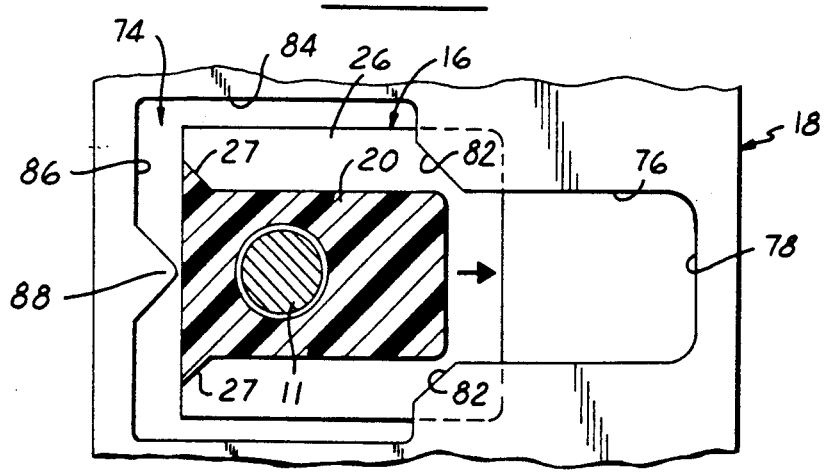
FIG. 12 is a view illustrating the speed control cable being mounted to the cable mounting bracket of FIG. 11.
Figure 13:
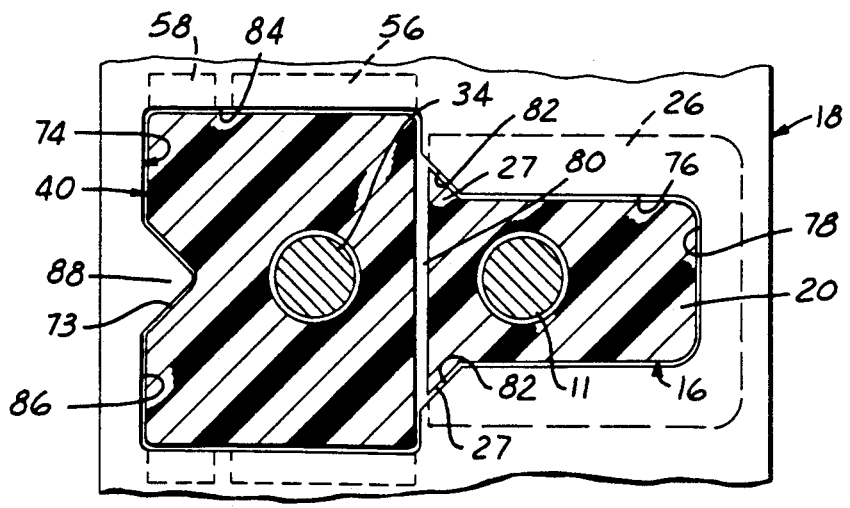
FIG. 13 is a view similar to FIG. 12 with the throttle and speed control cables mounted to the cable mounting bracket.

Referring to FIGS. 12 and 13, in operation, the speed control cable 10 slides into the cable mounting bracket 18. More specifically, the end fitting 16 is inserted into the second portion 84 of the aperture 74 until the space 26 is aligned with the thickness of the cable mounting bracket 18. The body 20 is slid or moved longitudinally into the first portion 76 of the aperture 74 such that the thickness of the cable mounting bracket 18 is disposed between the first and second flanges 24 and 26 and tangs 27 abut the included side walls 82. The tangs 27 prevent reverse installation of the end fitting 16 into the first portion 76 of the aperture 74.

Once the speed control cable 10 is mounted to the cable mounting bracket 18, the throttle control cable 32 snaps into the cable mounting bracket 18. More specifically, the end fitting 40 is inserted into the second portion 84 of the aperture 74 with the groove 73 of the retention portion 54 aligned with the projection 88 to prevent reverse installation of the end fitting 40 into the second portion 84 of the aperture 74. The retaining clips 56 and 58 deflect inwardly upon contacting the edges of the second portion 84 of the apertures 74 and deflect outwardly upon extending through the aperture 74. As illustrated in FIGS. 7, 9 and 10, the thickness of the cable mounting bracket 18 is disposed in the stepped recess portion 52 between the flange 46 and the inclined surface 70 and 72 of retaining clips 46 and 58, which contact the cable mounting bracket 18. The flange 46 and retaining clips 56 and 58 prevent longitudinal movement of the end fitting 40 relative to the cable mounting bracket 18. The operation may be reversed for disconnecting the throttle control cable 32 and speed control cable 10 from the cable mounting bracket 18. It should be appreciated that the retaining clips 56 and 58 would be moved inwardly toward the body 42 and retention portion 54 before the end fitting 40 could be disconnected from the cable mounting bracket 18.

Accordingly, the speed control cable 10 is prevented from longitudinal movement by flanges 24 and 26 and is held in place relative to the cable mounting bracket 18 by end fitting 40 of the throttle control cable 32. The throttle control cable 32 inches includes retaining clips 56 and 58 for positive connection to the cable mounting bracket 18.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

WHAT IS CLAIMED IS AS FOLLOWS:

1. A retaining assembly for retaining a throttle control cable and speed control cable to a cable mounting bracket, comprising;
    a first end fitting on the speed control cable having means for allowing said first end fitting to slide into an aperture in the cable mounting bracket and for preventing longitudinal movement of said first end fitting relative to the cable mounting bracket; and
    a second end fitting on the throttle control cable having means for allowing said second end fitting to snap into the aperture in the cable mounting bracket for preventing longitudinal movement of said second end fitting relative to the cable mounting bracket and having means abutting said first end fitting for preventing said first end fitting from disengaging the cable mounting bracket.

2. A retaining assembly as set forth in claim 1 wherein said means of said first end fitting comprises first and second flanges extending outwardly to define a space longitudinally therebetween.

3. A retaining assembly as set forth in claim 2 wherein said first end fitting has a body with a width and height less than said first and second flanges, said first and second flanges extending outwardly from said body.

4. A retaining assembly as set forth in claim 3 wherein said space has a width greater than a thickness of the cable mounting bracket.

5. A retaining assembly as set forth in claim 4 wherein said first end fitting includes means for cooperating with the aperture for preventing reverse installation of said first end fitting to the cable mounting bracket.

6. A retaining assembly as set forth in claim 1 wherein said abutting means of said second end fitting comprises a body.

7. A retaining assembly as set forth in claim 6 wherein said snap means comprises a retention portion transversely spaced from said body and having first retaining clips extending outwardly from each side thereof.

8. A retaining assembly as set forth in claim 7 wherein said body includes second retaining clips extending outwardly from each side thereof.

9. A retaining assembly as set forth in claim 8 wherein said first and second retaining clips have one end hingedly connected to said retention portion and said body respectively.

10. A retaining assembly as set forth in claim 9 wherein said first and second retaining clips have another end which extends freely longitudinally and has an inclined surface adapted to contact an edge defining the aperture of the cable mounting bracket.

11. A retaining assembly as set forth in claim 10 wherein said retention portion includes means for cooperating with the aperture for preventing reverse installation of said second end fitting to the cable mounting bracket.

12. A retaining assembly retaining a throttle control cable and speed control cable to a cable mounting bracket, comprising:
    a first end fitting on the speed control cable having means for allowing said first end fitting to slide into an aperture in the cable mounting bracket and for preventing longitudinal movement of said first end fitting relative to the cable mounting bracket;
    a second end fitting on the throttle control cable having means for allowing said second end fitting to snap into the aperture in the cable mounting bracket for preventing longitudinal movement of said second end fitting relative to the cable mounting bracket and having means abutting said first end fitting for preventing said first end fitting from disengaging the cable mounting brackets;
    wherein said first end fitting has a first body and said slide means comprises first and second flanges extending outwardly from said first body to define a space longitudinally therebetween;
    wherein said second end fitting has a second body and a retention portion transversely spaced from said second body and said abutting means comprises a portion on said second body adapted to abut said first body; and
    wherein said snap means comprises first and second retaining clips extending outwardly from each side of said second body and said retention portion.

13. A retaining assembly as set forth in claim 12 wherein said first end fitting includes means for cooperating with the aperture for preventing reverse installation of said first end fitting to the cable mounting bracket.

14. A retaining assembly as set forth in claim 13 wherein said first and second retaining clips have one end hingedly connected to said retention portion and said second body respectively.

15. A retaining assembly as set forth in claim 14 wherein said first and second retaining clips have another end which extends freely longitudinally and has an inclined surface adapted to contact an edge of the cable mounting bracket.

16. A retaining assembly as set forth in claim 15 wherein said retention portion includes means for cooperating with the aperture for preventing reverse installation of said second end fitting to the cable mounting bracket.

17. A retaining assembly comprising:
    a cable mounting bracket having means defining an aperture with first and second portions;
    a speed control cable having a first end fitting, said first end fitting having a first body and first and second flanges extending outwardly from said first body to define a space longitudinally therebetween to allow said first end fitting to slide into said first portion of said aperture in said cable mounting bracket and for preventing longitudinal movement of said first end fitting relative to said cable mounting bracket;
    a throttle control cable having a second end fitting, said second end fitting having a second body abutting said first end fitting for preventing said first end fitting from disengaging said first portion of said aperture of said cable mounting bracket, and a retention portion transversely spaced from said second body, said second body and said retention portion having first and second retaining clips, respectively, extending outwardly from each side thereof to allow for said second end fitting to snap into said second portion of said aperture in said cable mounting bracket for preventing longitudinal movement of said second end fitting relative to said cable mounting bracket;

said first end fitting including means for cooperating with said first portion of said aperture for preventing reverse installation of said first end fitting into said first portion of said cable mounting bracket; and said retention portion including means for cooperating with said second portion of said aperture for preventing reverse installation of said second end fitting into said second portion of said cable mounting bracket.

* * * * *